April 3, 1973 L. GIDGE 3,725,189
NON-TEAR SEAMS PRODUCED BY RADIO FREQUENCY MEANS
Filed Sept. 11, 1970 2 Sheets-Sheet 1

INVENTOR.
LESTER GIDGE
BY
*J. Bowen Ross, Jr.*
ATTORNEY

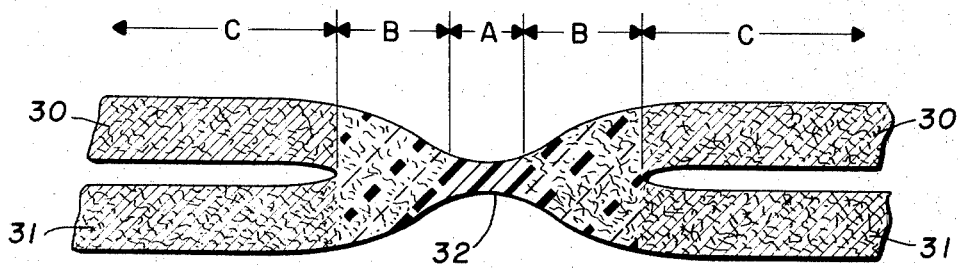
FIG. 4.
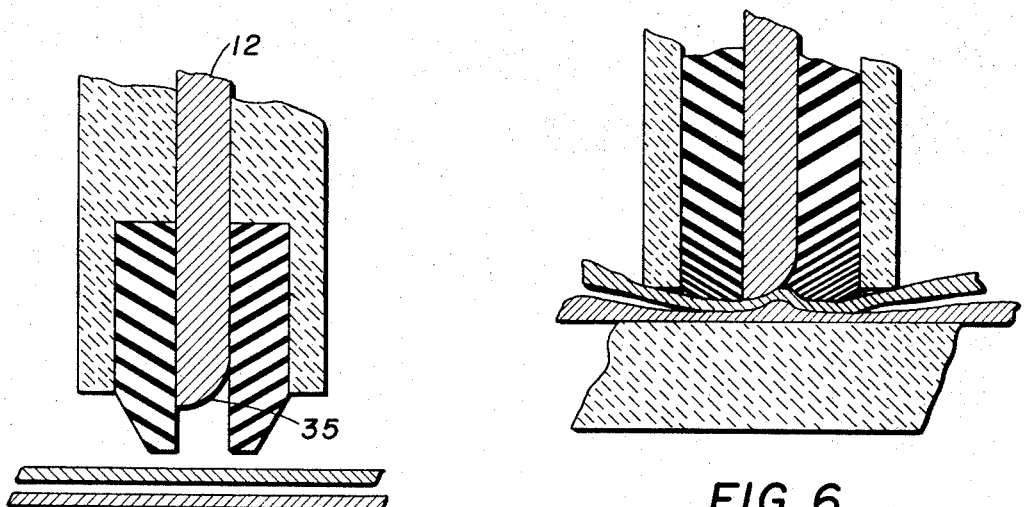
FIG. 5.
FIG. 6.
FIG. 7.

United States Patent Office 3,725,189
Patented Apr. 3, 1973

3,725,189
NON-TEAR SEAMS PRODUCED BY RADIO
FREQUENCY MEANS
Lester Gidge, Nashua, N.H., assignor to Monsanto
Company, St. Louis, Mo.
Filed Sept. 11, 1970, Ser. No. 71,554
Int. Cl. D04h 1/04; B32b 31/20; B29c 27/08
U.S. Cl. 161—146     2 Claims

ABSTRACT OF THE DISCLOSURE

Layers of fabric containing thermoplastic fibers are bonded together by radio frequency means along a seam, the seam being comprised of fused thermoplastic fibers with the intensity of fusion varying from a maximum along a maximum bond area to a minimum along the edge of the seam to prevent the formation of a tear line between the fabric and the seam.

BACKGROUND OF THE INVENTION

(1) Field of the invention

This invention relates to seam bonded fabric by radio frequency means and, more particularly, to a seam which joins at least two fabrics containing thermoplastic fibers together without a tear line being formed between the fabric and the seam.

(2) Description of the prior art

The basic invention of bonding thermoplastic fabric together by radio frequency means without arcing through the fabric is disclosed in my copending application, Ser. No. 71,656, filed Sept. 14, 1970, now Pat. No. 3,671,709. Arcing, which is an electrical discharge between the electrodes and which occurs along the sides of the electrodes, is prevented by recessing the electrodes in a dielectric resilient member. The dielectric resilient member contacts the fabric and fills the voids therein along an area adjacent the edge of the electrode. By eliminating the voids, arcing is prevented.

U.S. Pat. 2,517,672 to Jenkins shows a slightly crowned electrode flanked by a rigid dielectric material which is used to support plastic sheets between the electrodes. However, Jenkins relates only to the bonding of plastic sheet material and not to the bonding of fabric whether the fabric be woven or non-woven for the reason that the radio frequency bonding of fabric would be impossible by the Jenkins or any other prior art process.

SUMMARY OF THE INVENTION

While this invention is adaptable for use on planar articles containing meltable thermoplastic materials, it is most adaptable on knitted, woven and non-woven fabric comprised essentially of thermoplastic fibers, the molecules of which becoming excited when exposed to radio frequency power, said fibers being such as nylon, vinyl chloride, vinylidene chloride and cellulose acetate. This invention is especially adaptable for use on synthetic spunbonded fabric as described in U.S. Pats. 3,516,900; 3,276,944 and 3,341,394. The apparatus is comprised of a pair of movable electrodes, means for supplying radio frequency power to the electrodes and a resilient insulating member, such as a silicone rubber, which flanks the sides of a selected electrode. The selected electrode is recessed a distance in the resilient insulating member and is provided with a convex terminus. The resilient insulating member is adapted to prevent arcing through the fabric layers by filling the voids in the fabric. With the fabric layers between the electrodes, the electrodes are adaptable for moving towards each other to compress the fabric layers into intimate contact such that bonding occurs between the fabric layers upon the activation of the electrodes with radio frequency power.

The article of manufacture itself is comprised of at least two layers of fabric which contain thermoplastic fibers and a seam which joins the fabrics together. The seam is comprised of fused thermoplastic fibers with the intensity of fusion varying from a maximum along a maximum bond area located approximately in the center of the seam to a minimum along the edges of the seam. Thus, the seam shape taken in cross-section is of a general sloping depression, the shape of which does not produce a sharply creased indentation which might serve as a tear line at the juncture between the seam and the fabric. With the intensity of interfilament fusion increasing from the edge of the seam to the center, energy must be extended to rupture all of the filaments from the point of substantially no interfilament fusion to the point where substantially all of the filaments have been fused in order to cause failure of the fabric along the seam.

Therefore, an object of this invention is to provide a seam for joining fabric containing thermoplastic fibers together which does not present a tear line.

Another object of this invention is to provide an apparatus for forming a seam between two fabrics containing thermoplastic fibers such that the energy for rupturing the seam is substantially equivalent to the energy for rupturing either one of the fabrics comprising the seam.

DESCRIPTION OF THE DRAWINGS

FIG. 4 is an enlarged section view of the fabric having been joined by the seam of this invention;

FIG. 5 is an alternative embodiment of the electrode of FIG. 1 and showing an apparatus adaptable for forming a seam having a tear line along one edge but preventing the formation of a tear line along the other edge;

FIG. 6 is the section of FIG. 5 wherein the electrodes are in contact with the fabric; and FIG. 7 is the seamed fabric produced by the apparatus as shown in FIG. 5.

DETAILED DESCRIPTION OF THE PREFERRED EMBODIMENT

Figure 1:
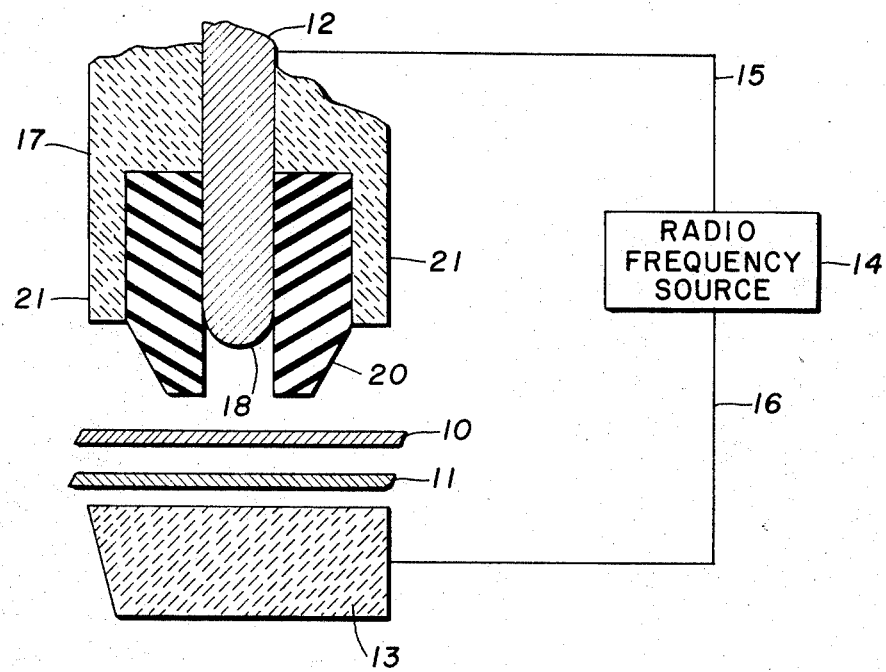
FIG. 1 is an enlarged section view of the electrode arranged in accordance with the principles of the invention and showing the same with two layers of fabric placed therebetween.

While the apparatus of this invention is operative on practically any fabric regardless of construction as long as it contains at least a significant portion of thermoplastic fibers, this invention is best illustrated by using spunbonded non-woven fabric as disclosed in U.S. Pat. 3,516,900. The filaments of these fabrics are wholly thermoplastic and are bonded together at a substantial number of filament cross-over points without the use of extraneous binder material. The fabric described in U.S. Pat. 3,516,900 is comprised of continuous nylon filaments bonded together at a substantial number of filament cross-over points by the absorption and subsequent removal of a hydrogen halide gas. Thus, the non-woven fabric is comprised completely of nylon.

Fabrics 10 and 11 which are to be bonded together by means of a seam are positioned between upper electrode 12 and lower electrode 13. The radio frequency energy required for bonding the fabrics together is supplied by radio frequency source 14. Radio frequency source 14 is connected to electrodes 12 and 13 by lines 15 and 16, respectively. Upper electrode 12 is mounted in movable housing 17 and is provided with terminus 18 which is arcuated in shape and which is recessed in resilient insulating member 20. Resilient insulating member 20 is retained by housing arms 21 which insure that resilient member 20 penetrates the fabric interstices.

Figure 2:
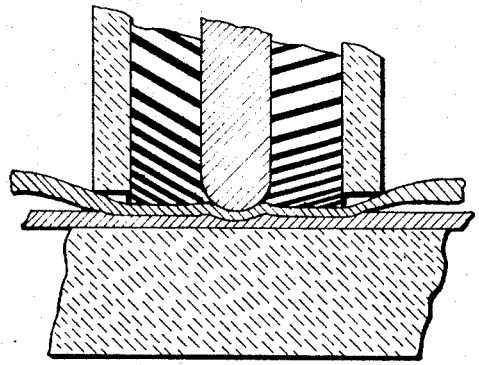
FIG. 2 is an enlarged view of FIG. 1 showing the electrodes in contact with the fabric and in a position to bond the fabric in the area between the electrodes.

The apparatus as shown in FIG. 1 is in a normal at rest position with terminus 18 of electrode 12 being recessed in resilient member 20 and out of contact with fabric 10. FIG. 2 represents the position of the electrode when bonding is to occur to form the seam. With sufficient pressure which may range from 5 to 25 or more pounds per linear inch of electrode width depending upon the softness of the fabric, resilient insulating member 20 fills the voids in the fabric adjacent the upper electrode 12 and prevents arcing through the fabric. Arcing between electrode 12 and electrode 13 occurs, if at all, along the exterior surfaces of electrode 12 and not directly beneath the same. Therefore, with resilient insulating member 20 penetrating the fabric, the air which is necessary for electrical discharge, is removed and arcing is prevented.

Figure 3:
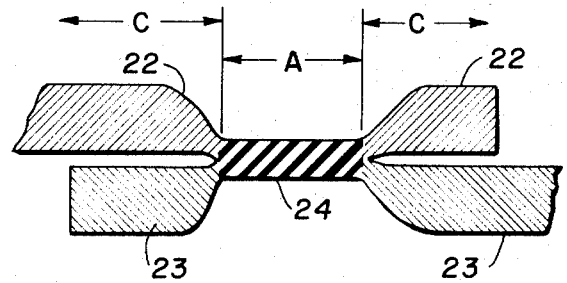
FIG. 3 is a view in cross-section of a fabric having a bonded seam formed by a conventional method using radio frequency means and showing the formation of tear lines between the seam and the fabric.

FIG. 3 represents a seam bonded layered fabric structure having tear lines and is comprised of fabrics 22 and 23 and seam 24. It can be seen that seam 24 throughout its length "A" (maximum bond area) is sharply indented from the surfaces of fabrics 22 and 23, the unbonded fabric length being represented by "C." The structure is either comprised of completely fused and immobile fibers along "A" or fibers completely free of fusion along "C." The junction between "A" and "C" form tear lines for the fibers of "C" are cantilevered from "A" and the force for rupturing the fibers at the "A" and "C" junction is the force necessary only to shear those filaments because fiber movement at the mentioned junction is prevented. Thus, it can be seen that if the formation of a tear line is to be prevented, a transition state between "A" and "C" is necessary, the transition state being where the fibers are neither completely fused nor completely free of fusion.

FIG. 4, which is the article of this invention, is comprised of fabrics 30 and 31 which are joined together by seam 32. The fabric under "C" represents fabric the fibers of which are completely free of fusion. The fabric under "A" is the maximum bond area and represents fabric the fibers of which have been completely fused. The fabric under "B" which is the diminishing bond area is the transition state where the filaments are neither completely fused nor completely free of fusion. Thus, the line between "B" and "C" represents the beginning of fiber fusion with a gradual increase in the intensity of fusion until the line between "B" and "A" is reached whereupon substantially all of the filaments have been completely fused so as to lose their identity. Since interfilament fusion is incomplete along "B," the fibers upon being subjected to a tearing force are able to move and to redistribute the applied load so as to prevent the formation of a shear plane or tear line as was shown in FIG. 3 between "A" and "C." Therefore in FIG. 4, the force required to tear fabric 30 from fabric 31 approaches the force required to tear either fabric alone, such force being substantially greater than the force required to tear the completely fused filaments under area "A" which substantially film-like.

FIGS. 5 and 6 represent an alternative embodiment of this invention where the article is comprised of two fabrics and a seam. A tear line is formed along one edge of the seam but is prevented from forming along the other edge. The only difference between the apparatus shown in FIGS. 5 and 6 and the apparatus shown in FIGS. 1 and 2 is that the end of upper electrode 12 is provided with an arcuated end 35 which has a maximum depth along one edge so as to provide maximum bonding along one edge of the resulting seam. Thus, FIG. 7 is a combination of FIGS. 3 and 4 in that along the left hand portion, "C" transforms directly into "A" whereas along the right hand portion, "A" gives way to "B," the area of incomplete fiber fusion, which in turn gives way to "C." Thus, the maximum intensity of interfiber fusion in "B" is adjacent to "A" with the intensity decreasing until "B" joins "C" whereupon no interfilament fusion exists at all.

From this disclosure, other embodiments of the present invention would be obvious. Likewise, the lower electrode may also be provided with a resilient member with both electrodes taking the form of rotatable disks which would provide for an endless seam along a fabric. Also, the electrodes may be mounted on a rotating drum which is associated with an electrical conductive surface, such as a movable belt, which is adapted to bear against the pattern of the roller for a specific length of the roller's arc with fusion in the formation of welds taking place substantially as heretofore described.

I claim:

1. An article of manufacture comprising at least two non-woven fabrics including organic synthetic filaments and a seam of a given width joining said non-woven fabrics together along a fabric length in a manner to prevent the formation of a tear line between said seam and said fabric along one edge of said seam and to form a tear line along the opposite edge of said seam, said seam being comprised of fused organic synthetic filaments with the intensity of fusion varying from a maximum bond adjacent said tear line to form that edge of said seam to a minimum along the opposite edge of said seam.

2. The article of claim 1 wherein said organic synthetic filaments are nylon.

References Cited

UNITED STATES PATENTS

| | | | |
|---|---|---|---|
| 3,312,250 | 4/1967 | Sirignano et al. | 156—73 |
| 3,184,354 | 5/1965 | Strother | 156—73 |
| 3,567,544 | 3/1971 | Nichols | 156—295 |
| 3,516,900 | 6/1970 | Mallonee et al. | 264—83 |

ROBERT F. BURNETT, Primary Examiner

R. A. DAWSON, Assistant Examiner

U.S. Cl. X.R.

156—272, 306, 380; 161—150

UNITED STATES PATENT OFFICE
CERTIFICATE OF CORRECTION

Patent No. 3,725,189      Dated April 3, 1973

Inventor(s) Lester Gidge

It is certified that error appears in the above-identified patent and that said Letters Patent are hereby corrected as shown below:

Column 4, line 43, insert -- area being -- before "adjacent".

Signed and sealed this 28th day of August 1973.

(SEAL)
Attest:

EDWARD M. FLETCHER, JR.       RENE D. TEGTMEYER
Attesting Officer      Acting Commissioner of Patents